Feb. 28, 1956    J. GONSKI    2,736,547
CONTINUOUS MINING MACHINE HAVING A CONVEYOR
AND AN ADJUSTABLE CUTTER BAR
Filed Aug. 31, 1954    4 Sheets-Sheet 1

INVENTOR.
JOSEPH GONSKI
BY
Murray A. Gleeson
ATTORNEY

Feb. 28, 1956 J. GONSKI 2,736,547
CONTINUOUS MINING MACHINE HAVING A CONVEYOR
AND AN ADJUSTABLE CUTTER BAR
Filed Aug. 31, 1954 4 Sheets-Sheet 2

INVENTOR.
JOSEPH GONSKI
BY Murray A. Gleeson
ATTORNEY

INVENTOR.
JOSEPH GONSKI

Feb. 28, 1956  J. GONSKI  2,736,547
CONTINUOUS MINING MACHINE HAVING A CONVEYOR
AND AN ADJUSTABLE CUTTER BAR
Filed Aug. 31, 1954  4 Sheets-Sheet 4

INVENTOR.
JOSEPH GONSKI
BY Murray G. Gleeson
ATTORNEY

United States Patent Office 2,736,547
Patented Feb. 28, 1956

2,736,547

CONTINUOUS MINING MACHINE HAVING A CONVEYOR AND AN ADJUSTABLE CUTTER BAR

Joseph Gonski, Chicago, Ill., assignor to Goodman Manufacturing Company, Chicago, Ill., a corporation of Illinois Application August 31, 1954, Serial No. 453,304

4 Claims. (Cl. 262—29)

This invention relates to improvements in mining machines of the multiple boring type including a mobile base frame and a cutting frame adjustable thereon for vertical and lateral tilting. The tiltable cutting frame usually has a pair of laterally spaced boring heads rotatably supported on axes perpendicular to the working face to cut contiguous bores in advance of the machine, and auxiliary horizontal upper and lower cutter bars disposed immediately behind the boring heads for trimming the circular bore pattern to produce flat roof and floor surfaces. The material dislodged from the face is removed by a conveyor mounted on the mobile frame and extending rearwardly to discharge the material upon a suitable transport means. A mining machine of the general character above described is disclosed in application Ser. No. 391,419, filed November 12, 1953, owned by the assignee of the present invention.

One of the principal objects of the present invention is to provide an improved and simplified construction and arrangement for the front end of the conveyor carried on the mobile base frame of a machine of the character above described, so as to accommodate the conveyor to variations in lateral and vertical tilting adjustments of the cutting frame relative to the mobile base frame.

Other objects of the invention will appear from time to time as the following description proceeds. The invention may best be understood by reference to the accompanying drawings, in which.

Figure 1:
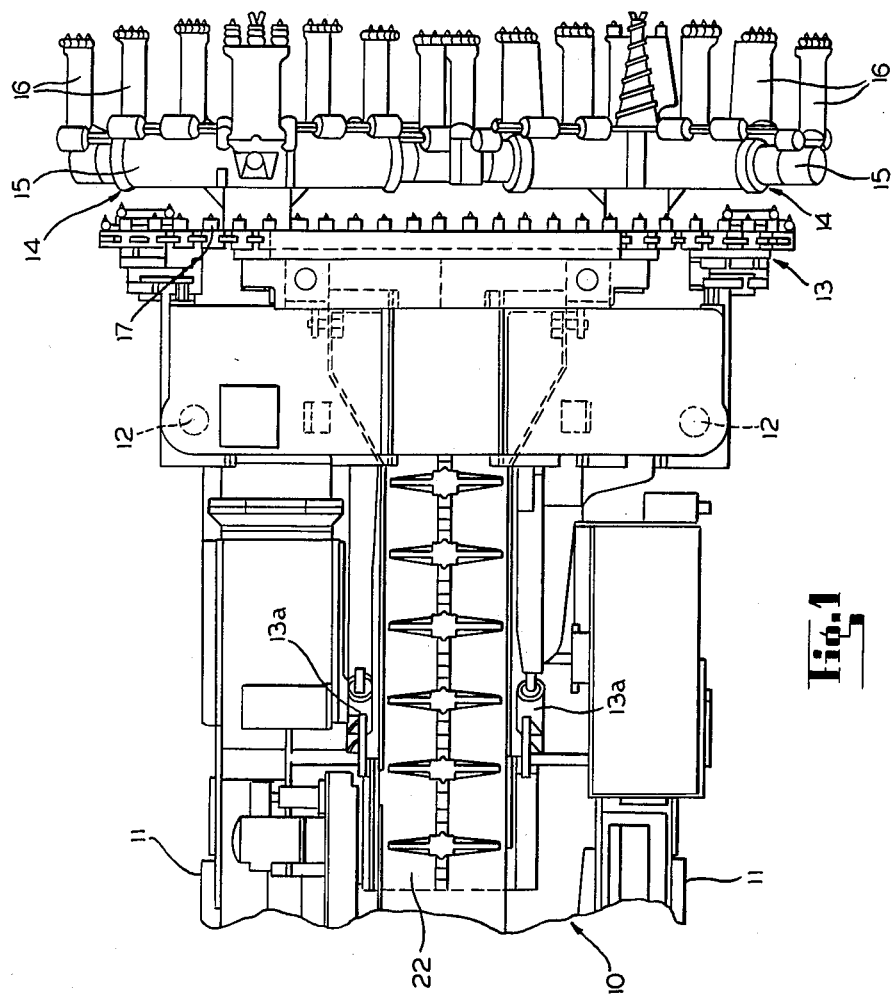
Figure 1 is a plan view of the front end of a mining machine of the type to which the present invention is applicable.

Referring now to details of the embodiment of the invention shown in the drawings, Figure 1 shows the front end of a mining machine of the general type shown in the application Serial Number 391,419, hereinabove mentioned, to which the present invention is particularly directed. The main structural features of said machine consist of a mobile base frame 10, mounted on endless treads 11, 11 and a cutting frame 13 mounted on the front end of said base frame for lateral and longitudinal tiltable adjustment as by a pair of vertically disposed jacks 12, 12 at the forward corners of the cutting frame, and a pair of rearwardly and downwardly inclined jacks 13a, 13a at the rear of said cutting frame.

The cutting frame has a pair of boring heads 14, 14 rotatably mounted on horizontal laterally spaced axes, each with a plurality of radial cutting arms 15, 15 having forwardly projecting cutter supports 16, 16 for cutting contiguous bores as the machine is advanced in the working face of a mine. The tiltable cutting frame also carries upper and lower chain carrying cutter bars 17 and 18 immediately to the rear of the cutter heads for producing flat horizontal roof and floor surfaces as the machine is advanced. The upper cutter bar 17 is seen in Figure 1, while the lower cutter bar 18 can be seen in the subsequent detail views. Both upper and lower cutter bars may be vertically adjustable as usual relative to the cutting frame 13, as shown in the drawing, the lower cutter bar 18 having a pair of vertically disposed laterally spaced piston rods 19, 19 connected thereto and working in hydraulic cylinders 20, 20 fixed to the front face of the cutting frame.

A flight conveyor indicated generally at 22 has its main portion mounted centrally of the base frame as usual for removing cuttings dislodged by the cutting devices on the cutting frame 13 for discharge at the rear end of the machine. The general arrangement of parts hereinabove described is substantially similar as disclosed in the prior application, Ser. No. 391,419 previously mentioned, so further details need not be further described herein, excepting as to those features of the present invention which relate to a novel arrangement for flexibly supporting a hinged front end portion 24 of the conveyor 22 on the lower cutter bar, to permit both tilting and vertical adjustment of said cutter bar relative to the base frame 10 on which the main part 22 of said conveyor is carried, as will now be described.

Figure 3:
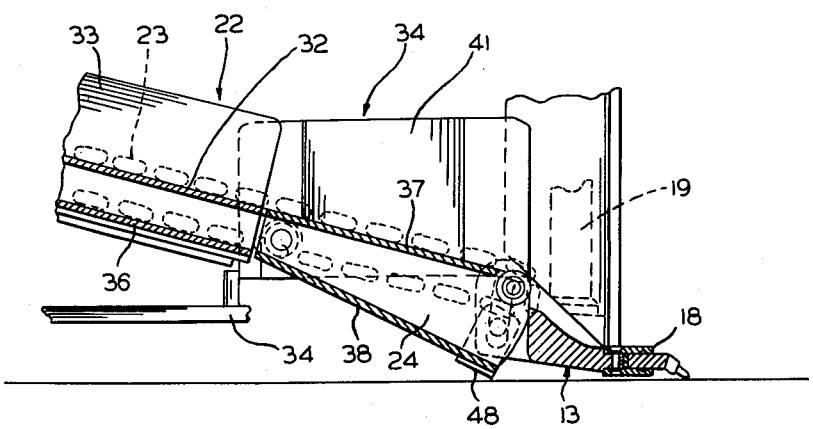
Figure 3 is a section taken on line 3—3 of Figure 2, showing the cutter bar and the front end of the conveyor in lowered operating position relative to the mine floor.

The conveyor 22 is of the conventional endless chain flight type, including a central chain 30 and transverse flights 31, with upper run of the main portion 23 moving along plate 32 and between side plates 33, 33, both fixed to a support 34 forming part of the base frame 10. The lower or return run of the conveyor is guided along a plate 36 spaced below plate 32. The hinged front end section 24 of the conveyor is hinged to the support 34 on a transverse axis, and includes an upper plate 37 having its rear edge adapted to abut the front edge of the fixed upper plate 32 of the main conveyor when the hinged front section 24 is in its normal material gathering position with said plates 37 and 32 in substantial alignment with each other, as shown in Figure 3. The hinged conveyor section 24 also has a lower guide plate 38 for supporting the return run of the conveyor. The chain conveyor passes over suitable idler rollers mounted along the front end of the hinged section 23, in the form shown the chain 30 passing over a central roller 39 and the ends of flights 31 passing over smaller rollers 40, 40 at opposite sides of said central roller.

Figure 2:
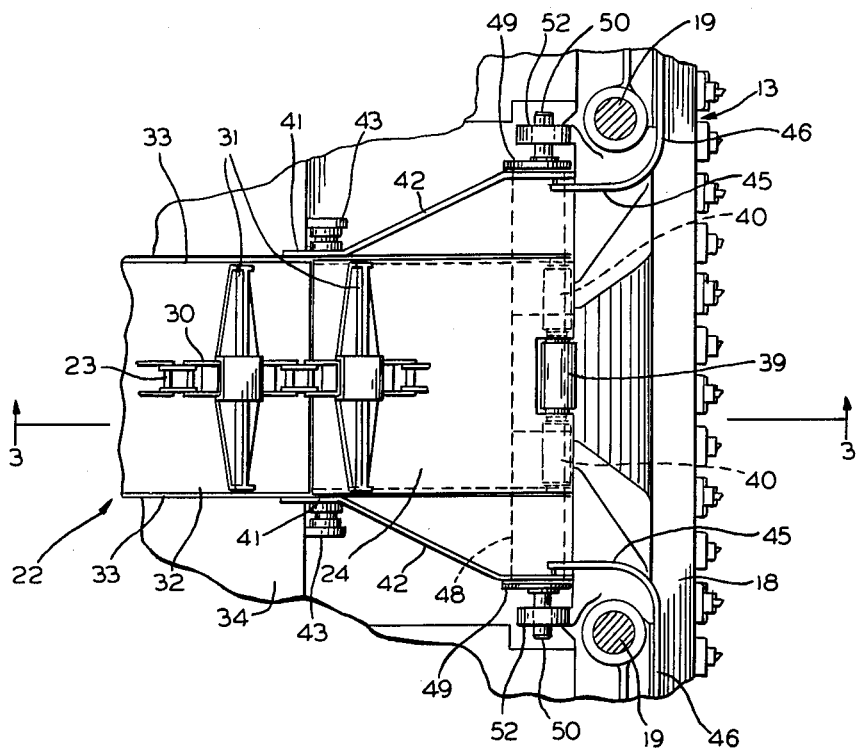
Figure 2 is a fragmentary detail section taken horizontally of the front end of the mining machine, showing the lower cutter bar and the conveyor in plan view, but with the boring heads and part of the conveyor chains omitted.

The main portion 23 of the conveyor has upright parallel side walls 41 which are extended into outwardly and forwardly flared side walls 42, along opposite sides of the hinged conveyor section 24. As will be seen in Figures 2 and 6, the rear end of the hinged conveyor section is pivotally mounted at 43, 43 where the parallel side walls 41 meet the flared side walls 42, and the front end of said hinged section is vertically swingable between a pair of triangular bottom plates 44 extending inwardly from and fixed to the flared side walls 42. It will therefore be understood that the parallel side walls 41, the flared side walls 42, and the triangular bottom plates 44 are all fixed on the main frame 10 of the machine independently of the cutter bar 18, and the hinged conveyor section 24 is vertically swingable relative to said main frame, also independently of said cutter bar.

The front ends of the flared side walls 42 extend forwardly into spaced relation on the outer sides of upright inwardly curved flanges 45 of baffle plates 46, fixed on the cutter bar 18. Said curved flanges thus define an open throat through which loose material dislodged by the mining machine is moved for loading on the hinged front end section 24 of the conveyor.

Figure 5:
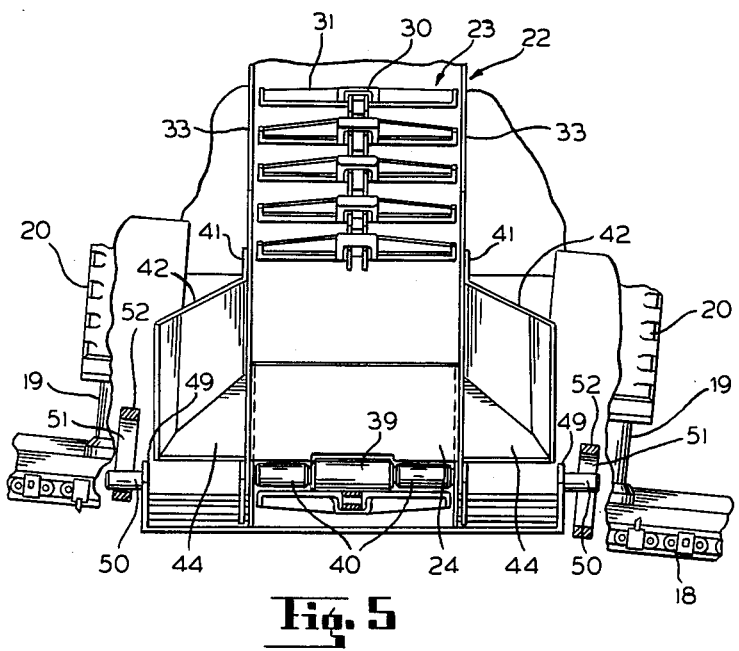
Figure 5 is a fragmentary detail front view of the parts shown in the preceding figures, but with the auxiliary frame and cutter bar tilted laterally relative to the base frame and the conveyor, and with parts of the cutter bar broken away to show details of the conveyor.

The hinged conveyor section 24 is flexibly connected to the cutter bar 18 so as to permit freedom of vertical and lateral tilting movement of said cutter bar and the cutting frame relative to the conveyor and the main frame, in the following manner:

A cross support 48 is connected transversely along front edge of bottom plate 38 of the hinged conveyor section 24, and has upturned flanged ends 49 with outwardly extending pins 50, thereon (see Figure 5). The flanged ends 49 of said cross support are in overlapping relation with the outer sides of the flared side walls 42 adjacent their front edges. Said pins are loosely supported in generally upright slots 51 formed in brackets 52 mounted on and projecting rearwardly from the cutter bar 18.

Figure 6:
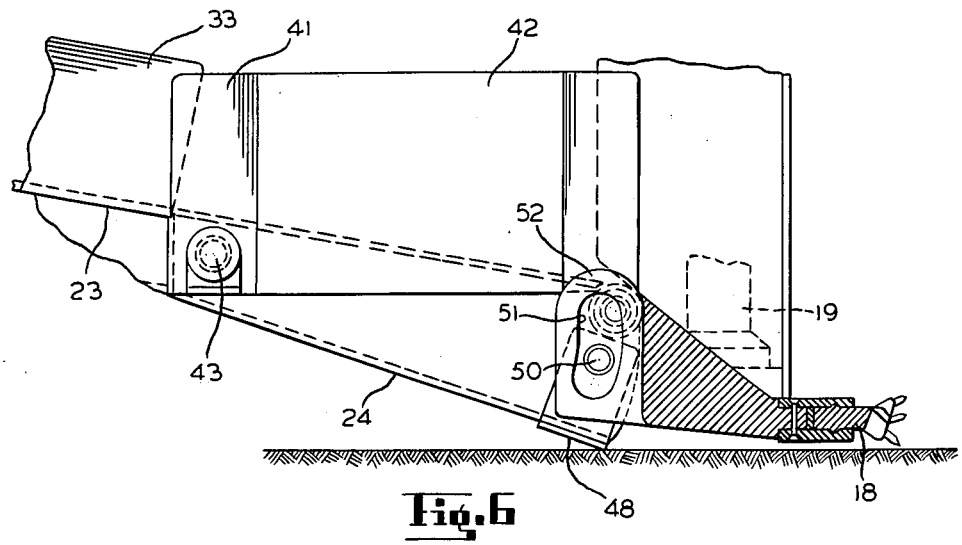
Figure 6 is an enlarged detail section taken on line 6—6 of Figure 1, with the parts shown in the same position as in Figure 3.
Figure 7:
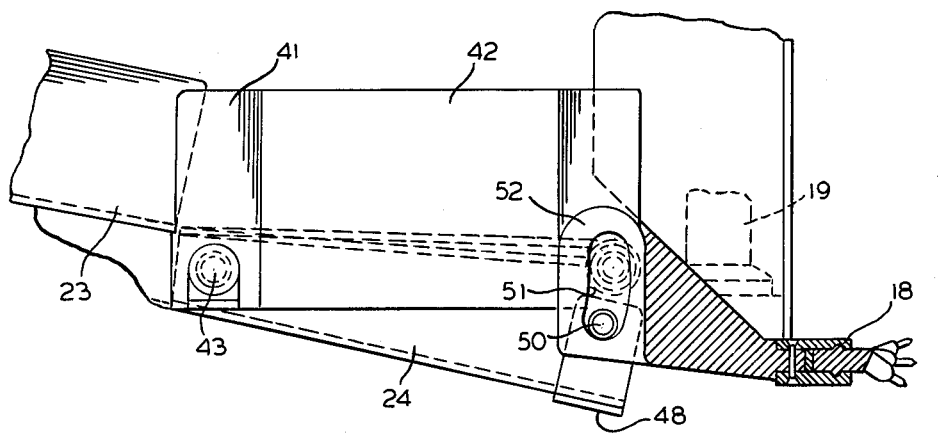
Figure 7 is a detail section similar to Figure 6, but showing conveyor and the cutter bar adjusted to an elevated position above the mine floor.

An important function of this pin-and-slot connection is to permit in effect a vertical floating action of the hinged conveyor section when the cutter bar 18 is in normal cutting position closely adjacent to and parallel with the mine floor, as indicated in Figure 6, wherein the lower front edge of said hinged conveyor section will engage the floor so as to be supported directly on the latter at the proper height to receive cuttings which are directed over said cutter bar during cutting operations. As will be observed in this figure, the pins 50 will be part way between the upper and lower ends of slots 51, so as to permit also, any lateral tilting movement of the cutter bar at any time. The arrangement is such, however, that if the cutter bar should be elevated from the ground as shown in Figure 7 (either by raising the cutter bar relative to the cutting frame 13, or by raising said cutting frame and cutter bar bodily relative to the main frame 10), any downward swinging movement of the hinged conveyor section 23, will be of limited degree, so that said hinge section will be lifted from the floor.

Figure 4:
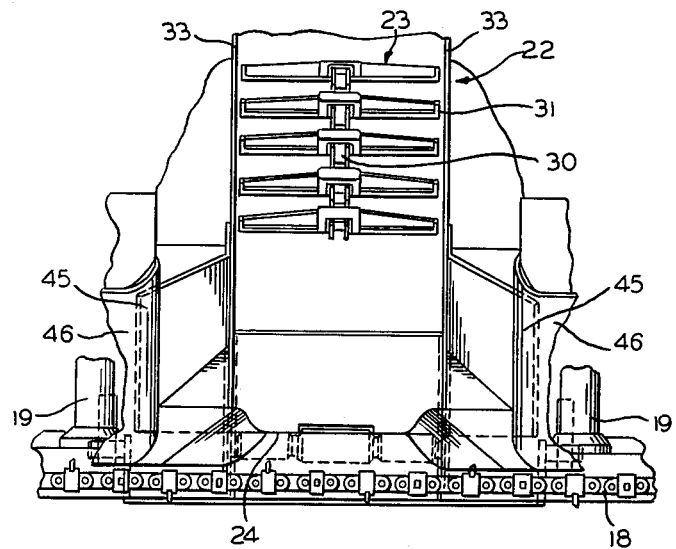
Figure 4 is a fragmentary detail front view of the parts shown in Figure 2.

It will be further noted, that the brackets 52 are spaced laterally beyond the flanged ends 49 of the cross support 48, so as to permit substantial lateral tilting movement of the cutter box relative to the conveyor or structure, as will be clearly seen by comparison of Figures 4 and 5. Moreover, the slots 51 into which the pins 50 extend, are considerably wider than the diameter of said pins, so as to permit substantial forward and rearward movement of the cutter bar relative to the conveyor structure when said cutter bar is tilted forwardly or rearwardly with the cutting frame 13 on which it is carried.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In a mining machine, a main frame, a cutting frame mounted on the forward end of said main frame including a horizontally disposed cutter bar along the bottom of said cutting frame, means affording lateral and vertical tilting adjustments of said cutting frame and cutter bar relative to said main frame, an endless flight conveyor on the main frame for discharging cuttings from said cutting frame, including a conveyor section fixed on said main frame rearwardly of said cutter bar, and an auxiliary conveyor section adapted to form a continuation of said fixed conveyor section having its rear end pivotally connected to the main frame on a transverse axis, said conveyor section and auxiliary conveyor section having continuous upright side walls along opposite sides thereof fixed to said main frame and terminating at their front ends in material-receiving relation to said cutter bar, and means flexibly connecting the front end of said auxiliary trough section to said cutter bar to maintain the latter in material-receiving relation to said cutter bar in all permissible positions of adjustment thereof.

2. The structure in accordance with claim 1, wherein the side walls of the conveyor along opposite sides of the auxiliary trough section are flared laterally to provide a widened throat for reception of cuttings, and generally horizontal bottom plates are fixed to the flared side walls, to fill the spaces between the side walls and the auxiliary trough section.

3. The structure in accordance with claim 1, wherein the means flexibly connecting the front end of the auxiliary trough section to the cutter bar includes a pair of pins projecting at opposite sides of the auxiliary trough section having loose fitting engagement in slotted supports fixed to the rear of the cutter bar.

4. The structure in accordance with claim 2, wherein the means flexibly connecting the front end of the auxiliary trough section to the cutter bar includes a transverse supporting member on the auxiliary trough section projecting beneath and beyond the flared side walls of the auxiliary trough section and having pins at the outer ends thereof in loose fitting engagement in vertically slotted supports fixed to the rear of the cutter bar.

No references cited.